United States Patent Office 3,354,119
Patented Nov. 21, 1967

3,354,119
CYCLIC SILOXANE-CONTAINING SILICONE POLYMERS
Tse C. Wu, Waterford, N.Y., assignor to General Electric Company, a corporation of New York
No Drawing. Continuation of application Ser. No. 299,153, Aug. 1, 1963, now Patent No. 3,297,632, dated Jan. 10, 1967. This application Apr. 18, 1966, Ser. No. 547,389
2 Claims. (Cl. 260—46.5)

ABSTRACT OF THE DISCLOSURE

Arylpolysiloxane polymers having repeating structural units of the formula,

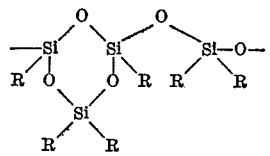

where R is phenyl, can be made by effecting reaction between 2,4-dichlorotetraphenylcyclotrisiloxane and diphenylsilanediol in the presence of pyridine. The arylpolysiloxane polymers are characterized by having good mechanical strength and decreased flexibility at elevated temperatures.

---

This application is a continuation of my copending application Ser. No. 299,153 filed Aug. 1, 1963, now U.S. 3,297,632 and assigned to the same assignee as the present invention.

This invention relates to polymeric materials. More particularly, the invention relates to polymers containing cyclic siloxane units which are characterized by good mechanical strength and other desirable physical properties.

While polysiloxanes consisting of flexible, straight chain siloxane units have been found to be useful in many applications, they have been found to be lacking in desired mechanical strength, particularly at elevated temperatures. It would thus be desirable to provide polysiloxanes which incorporate siloxane units, such as cyclic siloxane units, to provide decreased flexibility and hence increased strength and enhanced physical properties, particularly at elevated temperatures. A principal object, therefore, of the present invention is to provide such polymers.

Briefly, the present invention relates to silicone polymers which are constituted partially or entirely of incorporated cyclic siloxane units of the formula,

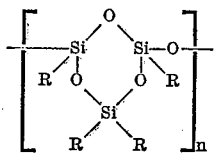

where R is a monovalent hydrocarbon radical and $n$ is a number equal to at least 5, e.g., from 5 to 50 or more. Illustrative of the radicals represented by R are alkyl radicals, e.g., methyl, ethyl, propyl, butyl, etc. radicals; cycloalkyl radicals, e.g., cyclohexyl, cycloheptyl, etc. radicals; alkenyl radicals, e.g., vinyl, allyl, etc. radicals; aryl radicals, e.g., phenyl, tolyl, xylyl, etc. radicals; aralkyl radicals, e.g., benzyl phenylethyl, etc. radicals. Preferably, the radicals represented by R are aryl radicals with phenyl radicals being the preferred specific radicals.

In addition to silicone polymers consisting of the siloxane units of the preceding formula, the present invention also contemplates polymeric materials having the formula,

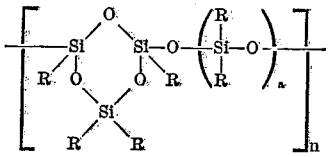

where R and $n$ are as previously defined and $a$ is a whole number equal to from 1 to 2, inclusive.

Within the scope of the present invention are also polymeric materials having the formula,

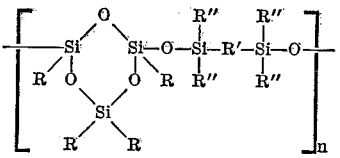

where R and $n$ are as previously defined and R' is a divalent arylene radical and R" is a member selected from the class consisting of methyl and phenyl radicals. Among the divalent arylene radicals represented by R' can be mentioned, for example, the three isomeric phenylene radicals as well as phenylene radicals containing nuclear substituents such as methyl-substituted phenylene radicals.

Those features of the invention which are believed to be novel are set forth with particularity in the claims appended thereto. The invention will, however, be better understood and further advantages thereof appreciated from a consideration of the following description.

The following examples describe the preparation of the materials of the present invention and are not to be taken as limiting in any way.

EXAMPLE 1

Phenyltrichlorosilane was partially hydrolyzed to produce 1,3-diphenyl-1,1,3,3-tetrachlorodisiloxane, the method used being similar to that of Burkhard, as set forth in J. Am. Chem. Soc., 67 2173 (1945). Next, 92.1 parts of the disiloxane prepared above are mixed together with 350 parts of anhydrous ethyl ether and 40 parts of pyridine as an acid acceptor, this mixture being added to a solution containing 54.1 parts of diphenylsilanediol, 350 parts of anhydrous ethyl ether and 90 parts of anhydrous tetrahydrofuran, the addition taking place over a period of 2 hours at room temperature. After the reaction mixture had been allowed to stand for 16 hours at room temperature, the pyridine hydrochloride formed was removed by filtration and the oily residue remaining after the removing of solvent was purified by molecular distillation. The fraction collected at 200° C. and $2\times10^{-5}$ mm. was examined by infrared spectroscopy which confirmed the formation of 2,4-dichlorotetraphenylcyclotrisiloxane having the formula,

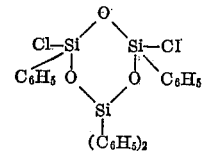

Next, a solution containing 10 parts of the so prepared cyclic trisiloxane in 35 parts of ethyl ether was added dropwise to a suspension of 10 parts of sodium bicarbonate in 70 parts of ethyl ether, which latter had been saturated with water, carbon dioxide gas being evolved during the addition. The reaction mixture was stirred at room temperature for 5 hours and then filtered by suction the filtrate being distilled to remove the solvent, leaving 4.7 parts of a clear, solid residue which was soluble in acetone, ethyl acetate and carbon tetrachloride. The residue was soluble in hot ethyl alcohol and was insoluble in hot hexane and attempts to recrystallize it from ethyl alcohol resulted in a gummy oil. The infrared spectrum of this product showed the presence of hydroxy bands at 2.75 microns and 2.95 microns as well as a 9.75 micron band due to the presence of a cyclic trimer. Next, a solution containing 2 parts of the hydroxyl intermediate prepared above in 45 parts of toluene was distilled slowly to dehydrate the compound. The water formed was removed as an azeotropic mixture by distillation as indicated by the cloudiness of the distillate. During the distillation, 100 parts of toluene was gradually added to replace the amount distilled and finally all the solvent was removed by distillation to leave a resinous residue. Infrared spectroscopy showed that the hydroxyl groups disappeared after this operation but that the cyclic trimer band remained. This polymer had the formula,

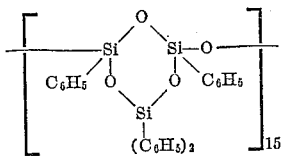

The above material is tack-free below about 80° C., has a fluid temperature of 120° C. and is rather brittle at room temperature. Its electrical properties are good and it is useful as an electrical insulating material to be applied, for example, in the form of tape or sheet to structures to be so insulated. Its insulating qualities are generally equivalent to those of polystyrene and phenolic resins.

EXAMPLE 2

This example illustrates the preparation of a copolymer consisting of the cyclotrisiloxane ring unit along with another type of unit. A mixture of 8.3 parts of sym-tetraphenyldisiloxanediol, 3.2 parts of pyridine and 25 parts of tetrahydrofuran was placed in a three-necked flask. There was added to the mixture dropwise a solution containing 10.2 parts of 2,4-dichlorotetraphenylcyclotrisiloxane in 45 parts of tetrahydrofuran, the addition being made with stirring at room temperature. When about 90 percent of the dichlorosiloxane solution had been added, another 20 parts of tetrahydrofuran were added to the remaining 10 percent of the solution to form a more dilute solution which was then in turn added slowly to the reaction mixture in order to approach the equivalent point slowly. After the addition, the reaction mixture was stirred for several hours at room temperature and filtered to remove the pyridine hydrochloride formed. The solvent was removed from the filtrate by distillation, leaving a gummy residue which hardened to a resinous polymer having the formula,

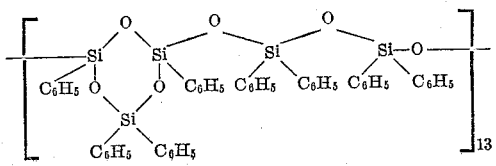

EXAMPLE 3

Example 2 was repeated using in place of the sym-tetraphenyldisiloxanediol 4.3 parts of diphenylsilanediol. The resulting product was a resin having the formula,

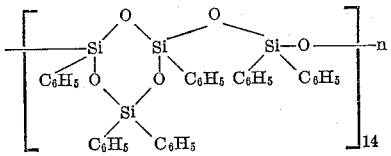

EXAMPLE 4

Example 2 was repeated using in place of the sym-tetraphenyldisiloxanediol 3.2 parts of 1,4-bis-(diphenyl-hydroxysilyl)benzene, the resulting product being a resinous material having the formula,

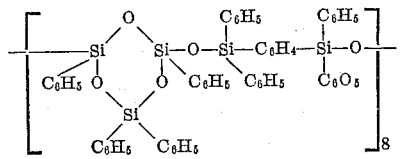

What I claim as new and desire to secure by Letters Patent of the United States is:

1. A polymeric material consisting essentially of recurring units of the formula,

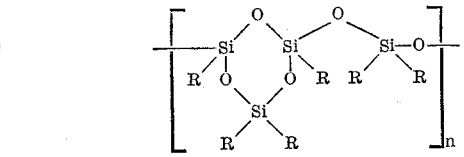

where R is selected from the class consisting of monovalent aryl radicals and halogenated monovalent aryl radicals, and $n$ is an integer equal to 5 to 50, inclusive.

2. A polymeric material in accordance with claim 1 consisting essentially of recurring units of the formula,

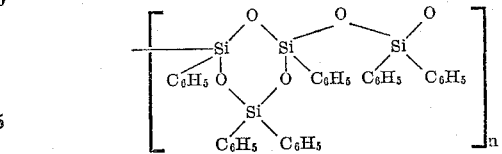

where $n$ is an integer equal to 5 to 50, inclusive.

References Cited

UNITED STATES PATENTS 2,375,998  5/1945  McGregor et al. _____ 260—46.5
3,297,632  1/1967  Wu _____ 260—46.5

FOREIGN PATENTS 561,136  5/1944  Great Britain.

OTHER REFERENCES

Andrianov et al.: Zhurnal Obshei Khimi (Journal of General Chemistry, U.S.S.R.) T-28, January–March 1958, pages 685–689.

Rochow: Chemistry of the Silicones, John Wiley and Sons, Inc., New York, 2nd ed., 195, pages 78 to 82.

DONALD E. CZAJA, *Primary Examiner.*

LEON J. BERCOVITZ, *Examiner.*

M. I. MARQUIS, *Assistant Examiner.*